(12) United States Patent
Kamesawa

(10) Patent No.: US 7,090,193 B2
(45) Date of Patent: Aug. 15, 2006

(54) BUTTERFLY VALVE

(75) Inventor: Jiro Kamesawa, Higashiosaka (JP)

(73) Assignee: Tomoe Technical Research Company Ltd., Higashiosaka (JP)

(*) Notice: Subject to any disclaimer, the term of this patent is extended or adjusted under 35 U.S.C. 154(b) by 18 days.

(21) Appl. No.: 10/509,129

(22) PCT Filed: Jul. 31, 2003

(86) PCT No.: PCT/JP03/09754

§ 371 (c)(1),
(2), (4) Date: Sep. 28, 2004

(87) PCT Pub. No.: WO2004/088184

PCT Pub. Date: Oct. 14, 2004

(65) Prior Publication Data

US 2005/0184267 A1  Aug. 25, 2005

(30) Foreign Application Priority Data

| Mar. 28, 2003 | (JP) | 2003-092285 |
| Mar. 28, 2003 | (JP) | 2003-092286 |
| Mar. 28, 2003 | (JP) | 2003-092287 |
| Mar. 28, 2003 | (JP) | 2003-092288 |

(51) Int. Cl.
*F16K 1/22* (2006.01)

(52) U.S. Cl. .................. 251/305; 251/359

(58) Field of Classification Search .......... 251/305, 251/249.5, 306, 308, 359, 360, 129.11
See application file for complete search history.

(56) References Cited

U.S. PATENT DOCUMENTS 3,143,132 A * 8/1964 Pangburn .................. 251/306
3,346,005 A * 10/1967 Hanssen .................... 251/306
3,425,439 A * 2/1969 Duffey et al. .............. 251/306
4,006,882 A * 2/1977 Bonafous ................... 251/306
4,014,511 A * 3/1977 Uno .......................... 251/306
4,148,458 A * 4/1979 Holtgraver ................ 251/306
4,289,297 A * 9/1981 Nakanishi ................. 251/306
4,318,422 A * 3/1982 Nakanishi et al. ......... 251/306
4,659,064 A * 4/1987 Scobie et al. .............. 251/308

(Continued)

FOREIGN PATENT DOCUMENTS

JP  3026251  1/2000

(Continued)

*Primary Examiner*—Justine R. Yu
*Assistant Examiner*—Andrew J. Rost
(74) *Attorney, Agent, or Firm*—Snider & Associates; Ronald R. Snider

(57) ABSTRACT

A portion of the one valve rod which extends outward is pivotally supported, the valve shaft cylindrical portion which is connected to the valve rod shaft supporting portion is made of material different from that of the valve body, a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft, a central portion of an inner peripheral surface of the valve body is allowed to project inward to form an engaging projection, the sheet ring is brought into contact with the inner peripheral surface of the valve body under pressure in the opposite sides of the recess groove, the cylindrical bush whose one end is closed is mounted to the other valve rod which pivotally supports the valve element, and the other valve rod is sealed.

32 Claims, 13 Drawing Sheets

U.S. PATENT DOCUMENTS 5,839,717 A * 11/1998 Feigel .................. 251/306

FOREIGN PATENT DOCUMENTS

| | | |
|---|---|---|
| JP | 3090420 | 7/2000 |
| JP | 3188680 | 5/2001 |
| JP | 2002-181203 | 6/2002 |

* cited by examiner

BUTTERFLY VALVE

TECHNICAL FIELD

The present invention relates to a butterfly valve for opening, closing and controlling a flow passage through which fluid passes. More particularly, the invention relates to a novel improvements of joining a valve body and a valve shaft cylindrical portion which are made of different kind of material, mounting a sheet ring to an inner peripheral surface of the valve body, sealing a valve rod which pivotally supports a valve element, and a gear box of an actuator which drives and rotates the valve element.

BACKGROUND ART

A wafer type butterfly valve which is sandwiched and mounted between flanges of a pipe to open and close a pipeline is conventionally known. Such butterfly valves are generally used for controlling fluid which is supplied to a plant equipment in various industrial fields.

As such a butterfly valve, there is a proposed structure in which in order to prevent condensation from being caused on a valve shaft cylindrical portion or an actuator which are opposed to atmosphere due to a temperature difference between atmospheric air and fluid which flows through a pipe, the valve shaft cylindrical portion is made of heat insulator (e.g., synthetic resin) which is different from material of the valve body so that a temperature of the fluid flowing through the valve body is not transmitted to the valve shaft cylindrical portion or the actuator, thereby preventing condensation from being cause. When the valve body and the valve shaft cylindrical portion are made of different materials, a joining structure therebetween is important. A disk-like valve element is disposed in the valve body. In order to drive and rotate the valve element, a valve rod outwardly extends in the valve shaft cylindrical portion. The valve rod is connected to the actuator which is mounted to an outer end of the valve shaft cylindrical portion. Since a torsional stress is applied to the coupled portion between the valve body and the valve shaft cylinder, a strong connecting structure is required. Japanese Patent No. 3026251 discloses one example of the butterfly valve which prevents the condensation. In the butterfly valve disclosed in this publication, connection grooves and connection legs which allow connecting portions of the valve body and the valve shaft to fit to each other are disposed around the valve shaft cylindrical portion at distances from one another, the connection grooves and the connection legs are engaged with each other to ensure the strength against the torsional stress, they are connected to each other using screws to prevent the connection legs from coming out from the connection grooves but they can be separated from each other. In such a structure, however, when the connection leg is fitted into the connection groove, if there is a gap therebetween, a rattle is generated, which may damage the connection groove and the connection leg. Therefore, precise machinability is required, and a plurality of connection grooves and connection legs must be provided around the valve shaft cylindrical portion at equal distances from one another, and the costs adversely increase.

The valve body comprises a valve body made of rigid material such as metal which passes through a cylindrical flow passage, a disk-like valve element which is rotatably pivotally supported by a valve rod in the valve body, and a sheet ring made of elastic material. The sheet ring is interposed between an inner peripheral surface of the valve body and the valve element. An outer peripheral surface of the valve element is brought into contact with and disengagement from an inner peripheral surface of the sheet ring to open and close the flow passage. The sheet ring of the butterfly valve is made of elastic material. When the valve is closed, the sheet ring is brought into contact with and engagement in the inner peripheral surface of the sheet ring under pressure, thereby securing sealing ability, and when the valve is closed, a great repulsion is generated by pressure-contact between the sheet ring and the valve element, and the rotation torque of the valve element is increased. There is a tendency that the sheet ring is fallen off from the valve body by a suction force caused by fluid or by a dragging force caused by pressure-contact with the valve element. In order to prevent the sheet ring from falling off from the valve body, there is a proposed structure in which opposite side surfaces of the sheet ring are fitted to a peripheral side surface of the valve body, the outer peripheral surface of the sheet ring is mounted to the inner peripheral surface of the valve body with a necessary compression margin to exhibit elastically fastening force. Japanese Patent No. 3188680 proposed a structure in which a projecting stripe is provided on a central portion of the outer peripheral surface of the sheet ring, the projecting stripe is fitted into a recess formed in a central portion of an inner peripheral surface of the valve body, thereby preventing the sheet ring from moving. In any of the structures, however, the sheet ring is strongly mounted so that the inner peripheral surface of the valve body does not move. When the valve is closed, elastic repulsion force of the sheet ring when the valve element comes into contact with the inner peripheral surface of the sheet ring becomes great, the rotation torque of the valve element is increased, and it is difficult to open and close the valve.

Further, the valve rod which rotatably pivotally supports the valve element is pivotally supported by a valve rod shaft supporting portion and is extended outward in a radial direction of the valve body. An actuator is connected to an outer end of one of the valve rods such that the actuator can drive and rotate. The other valve rod is sealed by a lid body mounted to an outer end of the valve rod shaft supporting portion and is shaft-sealed. One example of the shaft seal apparatus is disclosed in Japanese Patent Application Laid-open No. 2002-181203. According to the shaft seal apparatus disclosed in this publication, a bush is interposed between the valve rod and a valve rod shaft supporting portion of the valve body, and it is necessary to dispose an O-ring between the bush and the valve rod shaft supporting portion and the valve rod to seal therebetween, the sealing structure becomes complicated, it is necessary to fasten a lid body which seals an outer end of the valve rod shaft supporting portion using screws, which is troublesome and inconvenient.

Further, an actuator is connected to one of the valve rods which rotatably and pivotally supports the valve element to drive and rotate the valve rod. A manual gear type actuator is generally and widely employed as this actuator. According to this manual gear type actuator, a worm gear mechanism in which a worm wheel and a worm are meshed with each other is incorporated in a gear box, a valve rod is connected to the worm wheel, a manual handle is connected to the worm, and the valve element is rotated and driven manually. This manual gear type actuator is disclosed in Japanese Patent No. 3090420. A gear box of the conventional manual gear type actuator disclosed in this publication is usually a metal molded product such as an aluminum die casting. The gear box is filled with lubricant which lubricates a worm gear incorporated in the gear box. A stopper comprises a screw for aligning a valve element to a fully opened position and a fully closed position to stop worm wheel in a angle of 90 degree rotation range, so that the stopper position is adjusted. However, in order to effectively utilize a building in recent years, the gear box is disposed in a room where a normal work is carried out without providing a machine room underground in many cases, and there is a problem that a floor or a wall surface in the room is contaminated by grease leaking from the gear box. Further, since the adjusting screw is used, a structure of the gear box is complicated, and there is also a problem that condensation is caused on an outer surface.

Problems that this Invention is to Solve

First object of this invention is to precisely joint a valve body and a valve shaft cylindrical portion which are made of different materials such as metal and synthetic resin using relatively easily machining operation, thereby exhibiting sufficient strength against a torsional stress, and to prevent the valve body and the valve shaft cylindrical portion from falling off from each other using a simple structure.

Second object of the invention is to mount the sheet ring to the inner peripheral surface of the valve body with sufficiently great elastic fastening force, and to stably mount the sheet ring, and to reduce a rotation torque of the valve element.

Third object of the invention is to reliably seal a shaft seal of a valve rod which rotatably and pivotally support the valve element with a simple structure.

Fourth object of this invention is to solve problems concerning leakage of grease, generation of condensation and complication of a structure which are found in the manual gear type actuator.

Means for Solving the Problems

The present invention provides a butterfly valve in which a cylindrical flow passage is formed in the valve body such as to penetrate the valve body, a sheet ring made of elastic sealing material is mounted in the valve body, a disk-like valve element which comes into contact with and separates from the sheet ring is rotatably and pivotally supported by the sheet ring, a valve rod shaft supporting portion is formed in a radial direction of the valve body, the valve rod shaft supporting portion pivotally supports valve rods which pivotally support the valve element, an actuator is connected to an outer end of one of the valve rods, thereby driving and rotating the valve element, wherein a portion of the one valve rod which extends outward is pivotally supported, the valve shaft cylindrical portion which is connected to the valve rod shaft supporting portion is made of material different from that of the valve body, the ends of the valve shaft cylindrical portion and the valve rod shaft supporting portion are formed into rectangular cylindrical recess and projection which are fitted to each other, a fitting projection and a fitting groove which fit to fitting surfaces of the valve shaft cylindrical portion and the valve rod shaft supporting portion are formed, a connection pin is driven into the fitting portions of the valve shaft cylindrical portion and the valve rod shaft supporting portion and they are connected to each other in a falling-out preventing state. Preferably, the valve body is molded using aluminum die cast, the valve shaft cylindrical portion is molded using synthetic resin having insulative properties, iron-based casting or metal material which is different from that of the valve body. A thickness of an inner surface angle portion of the recess with which an angle portion of the projection comes into contact upon reception of torsional stress from the actuator is made thick, the fitting projection and the fitting groove are located near this thick angle portion.

A compression margin of the sheet ring with respect to an inner peripheral surface of the valve body is set such that the compression margin is small at a central portion of the sheet ring and the compression margin is great at opposite sides of the sheet ring so that the sheet ring is held by the inner peripheral surface of the valve body by an elastic fastening force at the opposite sides, the central portion of the sheet ring with which the valve element comes into contact under pressure is allowed to move slightly together with the valve element, and a movable torque of the valve element is reduced. Preferably, a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft. A central portion of an inner peripheral surface of the valve body is allowed to project inward to form an engaging projection, a recess groove into which the engaging projection is formed in the outer peripheral surface of the sheet ring, and the sheet ring is held by engaging the engaging projection and recess groove with each other. A slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft.

Further, a cylindrical bush whose one end is closed is inserted into the other valve rod, an inner end of the bush is brought into contact with the sheet ring under pressure to seal the valve rod, and outer end of the bush is supported in a falling-out preventing state by means of a pin which is driven into the valve rod shaft supporting portion. Preferably, an O-ring is interposed between the bush and the valve rod shaft supporting portion to seal a gap therebetween, and a knob is formed on an outer end of the bush for taking out the bush.

Further, the actuator comprises a coupled body of upper and lower gear boxes in which a manually driven worm gear mechanism is integrally incorporated in the gear box, both the upper and lower gear boxes are molded products made of synthetic resin, a stopper portion which limits a rotation range of the worm gear mechanism is integrally formed in the gear box, one connection peripheries of the upper and lower gear boxes are formed with upper standing walls to which the other peripheries are fitted, the upper standing wall is provided at its outer side with a sealing projection.

Further, the invention provides a butterfly valve in which a cylindrical flow passage is formed in the valve body such as to penetrate the valve body, a sheet ring made of elastic sealing material is mounted in the valve body, a disk-like valve element which comes into contact with and separates from the sheet ring is rotatably and pivotally supported by the sheet ring, a valve rod shaft supporting portion is formed in a radial direction of the valve body, the valve rod shaft supporting portion pivotally supports valve rods which pivotally support the valve element, an actuator is connected to an outer end of one of the valve rods, thereby driving and rotating the valve element, wherein a portion of the one valve rod which extends outward is pivotally supported, the valve shaft cylindrical portion which is connected to the valve rod shaft supporting portion is made of material different from that of the valve body, ends of the valve shaft cylindrical portion and the valve rod shaft supporting portion are formed into rectangular cylindrical recess and projection which are fitted to each other, a fitting projection and a fitting groove which fit to fitting surfaces of the valve shaft cylindrical portion and the valve rod shaft supporting portion are formed, a thickness of an inner surface angle portion of the recess with which an angle portion of the projection comes into contact upon reception of torsional stress from the actuator is made thick, the fitting projection and the fitting groove are located near this thick angle portion, a connection pin is driven into the fitting portions of the valve shaft cylindrical portion and the valve rod shaft supporting portion and they are connected to each other in a falling-out preventing state, the valve body is molded using aluminum die cast, and the valve shaft cylindrical portion is molded using synthetic resin having insulative properties, a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft, a central portion of an inner peripheral surface of the valve body is allowed to project inward to form an engaging projection, a recess groove into which the engaging projection is formed in the outer peripheral surface of the sheet ring, the sheet ring is brought into contact with the inner peripheral surface of the valve body under pressure in the opposite sides of the recess groove, the cylindrical bush whose one end is closed is mounted to the other valve rod which pivotally supports the valve element, and the other valve rod is sealed.

Effect of the Invention

According to the present invention, the valve body and the valve shaft cylindrical portion are made of different materials, they are connected with each other with sufficient strength against the torsional stress, and it is possible to reliably prevent the valve from being damaged by the torsional stress and to prevent rattle from being generated. The falling-out in the axial direction can also be prevented reliably, and it is possible to provide an extremely excellent connection structure between the valve body and the valve shaft cylindrical portion made of different materials.

It is possible to mount the sheet ring to the inner peripheral surface of the valve body with sufficiently great elastic fastening force, and to stably mount the sheet ring. A rotation torque of the valve element can be reduced.

Further, the shaft seal of the valve rod can be achieved with a simple structure in which the bush is inserted into the valve rod and is fixed using a pin. It becomes easy to automate the shaft seal of the valve rod.

Further, since the upper and lower gear boxes are molded using synthetic resin, the size precision is enhanced, the stopper can be integrally formed. Since opening adjusting means by means of a screw is not required, the entire structure can be simplified, and the costs can be reduced. Since synthetic resin having insulative properties is used, it is possible to effectively prevent condensation. It is easy to obtain a greaseless structure using resin having higher lubrication ability. This greaseless structure can solve the problem of contamination of a room floor and a wall surface caused by leakage of grease, and this structure is extremely beneficial.

BEST MODE FOR CARRYING OUT THE INVENTION

Figure 1:
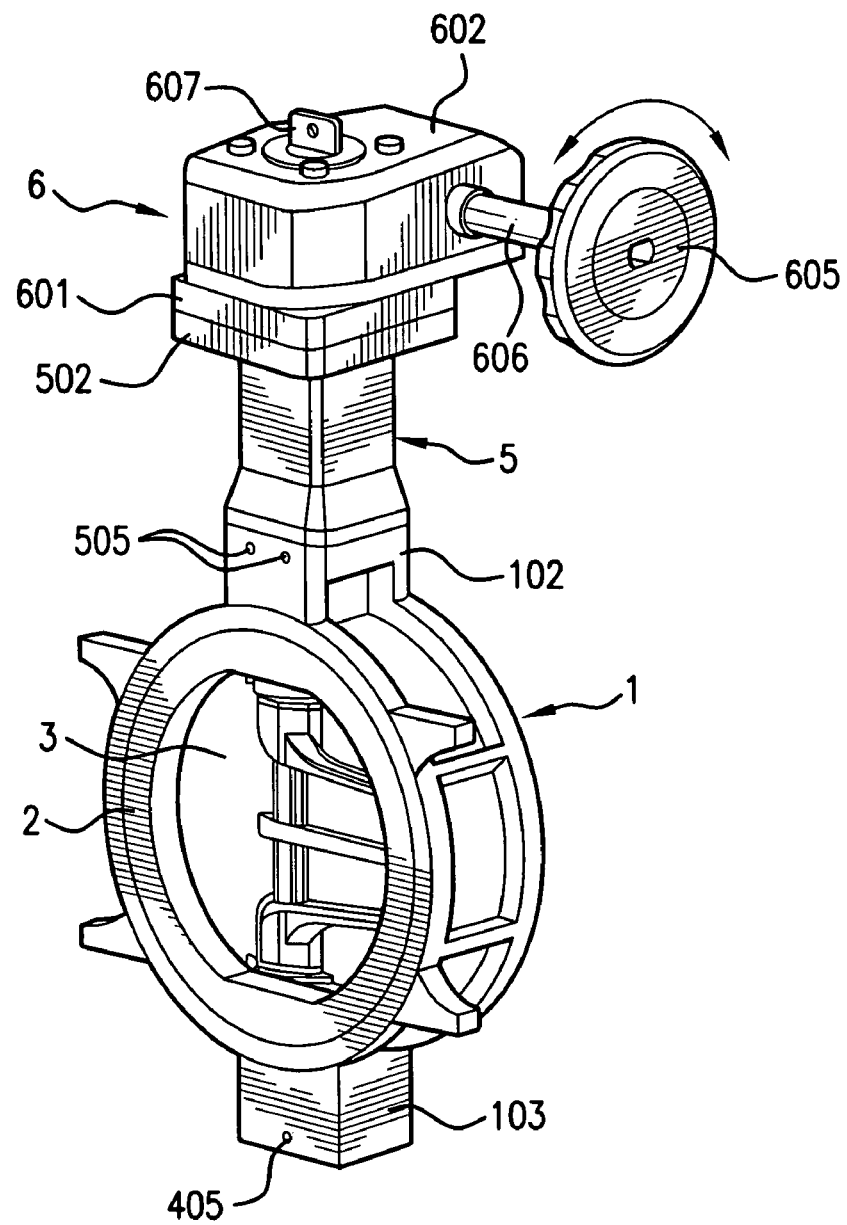
FIG. 1 is a perspective view of an outer appearance of an entire butterfly valve according to the present invention.

A preferred mode for carrying out the invention will be explained in detail. The invention is characterized in that a valve body and a valve shaft cylindrical portion are made of different materials such as metal and synthetic resin, and the valve body and the valve shaft cylindrical portion are connected with each other with sufficient strength against a torsional stress and a falling-out. For example, the valve body is made of metal such as aluminum die cast or casting, and the valve shaft cylindrical portion is made of metal material which is different from that of synthetic resin such as nylon ABS, PBT, PPS or the like and the valve body. The valve body and the valve shaft cylindrical portion are connected to each other such that substantially angular cylindrical recesses and projections of the valve body and the valve shaft cylindrical portion are fitted to each other. Opposed fitting surfaces of the recess and the projection are formed with fitting groove and fitting projection which fit to each other. By fitting the fitting groove and the fitting projection to each other, the valve body and the valve shaft cylindrical portion are connected to each other with sufficient precision and strength, and it is possible to cope with the torsional stress, and easy machinability can be achieved.

The number of fitting grooves and the fitting projections may be one each, but it is preferable that at least two fitting grooves and fitting projections are formed on central opposed position of the angular cylindrical shaped recess and the projection to exhibit more reliable detent function, thereby enhancing strength against the torsional stress. By fitting the fitting groove and the fitting projection to each other to exhibit the detent function, the machining precision of the angular cylindrical recess and projection is not especially required, and precision to such a degree that they are fitted to each other tightly in some degree is sufficient. In generally, when two members are fitted to each other and held by angle shape, machining precision of fitting surfaces is required, and if the precision is insufficient, a gap is generated, a rattle is generated and there is an adverse possibility that the members are damaged. However, it is extremely difficult to precisely machine the entire fitting surface, and especially when they are made of different materials, the difficulty is further increased, and costs are largely increased.

In this invention, the fitting groove and the fitting projection are precisely formed, they are fitted to each other to achieve the fitting connection, and precision in the recess and the projection which are angular cylindrical portions is not required. Therefore, the machining operation is easy as compared with a case in which the entire surface of the angular cylindrical portion is precisely machined. Since the fitting groove and the fitting projection which requires precision are groove and projection having small width and extending in the axial direction, precise machining operation can be carried out relatively easily. In the die casting or resin formation, since a product is taken out from a die, it is necessary to provide a draft angle. A draft angle of metal is greater than a draft angle of resin. However, in the case of a limited specific portion such as the fitting groove and the fitting projection of the present invention, the draft angle can be set to zero, and by providing no draft angle, the precision can be enhanced. In the case of resin formation, the precision of only the fitting groove is partially enhanced to mold. In the case of die cast molding, it is possible to partially enhance the precision of the fitting projection by post-machining such as shaving working.

According to this invention, it is possible to precisely machine only a portion which needs to be precise, and by fitting the precisely formed fitting groove and fitting projection to each other, it is possible to connect the valve body and the valve shaft cylindrical portion which are made of different materials with each other with sufficient strength, and they can be connected to each other with strength which can sufficiently withstands torsional stress applied to the connected portion therebetween. The connected valve body and valve shaft cylindrical portion are coupled to each other through a connection pin which is driven in a direction perpendicular to the axial direction, which prevents the valve body and the valve shaft cylindrical portion from separating from each other in the axial direction.

Since the greatest valve-closing driving force is applied to the connected portion between the valve body and the valve shaft cylindrical portion in the fully closing direction, it is necessary to enhance the strength of the inner surface angle portion of the recess of the valve body which collides and contact with the angle portion of the projection of the valve shaft cylindrical portion in the fully closing rotating direction. In the present invention, a thickness of this portion is increased, the fitting projection formed in the inner surface of the recess is located slightly closer to this thick portion not on a central portion, and the valve-closing driving force is concentrated on one location.

Next, the invention is characterized in that a sheet ring made of elastic sealing member which is mounted to an inner peripheral surface of the valve body, a central portion of the sheet ring with which the valve element comes into contact under pressure is mounted to the valve body with a small compression margin, at least one side, preferably both sides of the central portion are mounted to the valve body with large compression margin, the compression margins of the sheet ring to the valve body are different, so that the sheet ring is strongly mounted to the valve body on the side having the large compression margin, and the sheet ring is brought into contact with the valve element on the central portion having small compression margin, thereby reducing the rotation torque of the valve element.

Figure 13:
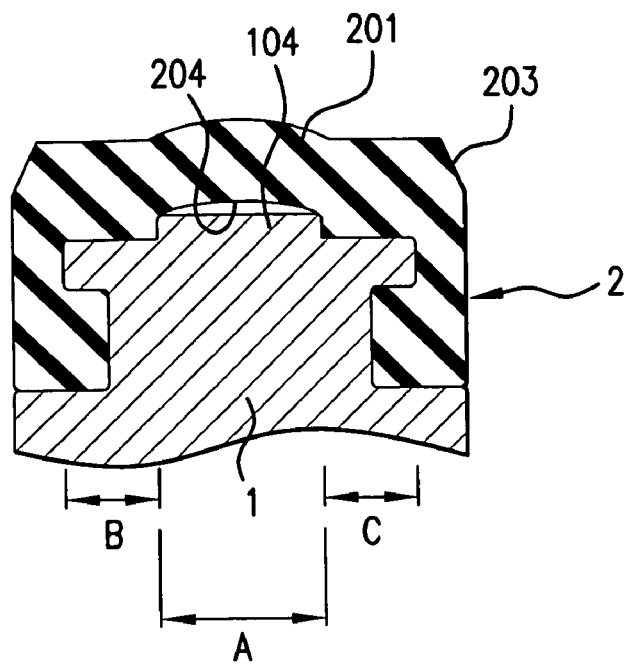
FIG. 13 is an enlarged sectional view of an essential portion of a mounting structure between the sheet ring and the valve body.

A central portion of an outer peripheral surface of the sheet ring is formed with a recess groove. The recess groove has such width and depth that an engaging projection formed on an inner peripheral surface of the valve body is engaged in the recess groove. The recess groove is formed such as to surround the outer peripheral surface. An outer diameter of the sheet ring does not have size which is not tightly contact with an inner surface of the valve body in its portion of the recess groove (portion A in FIG. 13) and is formed in a gentle contact state. On the other hand, both sides (portions B and C in FIG. 13) of the recess groove have outer diameters which are tightly contacted with the inner peripheral surface of the valve body, and is formed into a tight contact state. With this, the sheet ring is inserted and held by the inner peripheral surface of the valve body at the opposite side portions B and C of the recess groove, the sealing ability is exhibited, and in a portion of an angle sheet portion (corresponding to the portion A) with which the valve element comes into contact under pressure, as the valve element comes into contact, the portion A of the sheet ring is allowed to deviate, and it is possible to reduce the rotation torque of the valve element. That is, since the compression margins of the sheet ring are different in the portions A to C, it is possible to both reduce the mutually contradictory torque, and to hold the sealing ability at the same time. Further, in a central portion having the small compression margin, the recess groove provided in the outer peripheral surface of the sheet ring is engaged with the engaging projection provided on the central portion of the valve body, the projection and the recess groove are engaged with each other, thereby restraining the sheet ring from moving, the suction force of fluid and contact with the valve element prevent the sheet ring from falling off from the valve body. The inner peripheral surface of the sheet ring is formed with an angle sheet portion which projects in a direction of an inner diameter. The outer peripheral surface of the valve element comes into contact with and seats on the angle sheet portion, thereby closing the valve. A width of the angle sheet portion is greatest at a position where the angle sheet portion intersects with a valve shaft hole at right angles through which the sheet ring passes in a radial direction. The width of the angle sheet portion is gradually reduced as approaching the valve shaft hole, and the width of the angle sheet portion is the smallest in a periphery of a boss of the valve shaft hole. With this design, the contact pressure with respect to the valve element can substantially be equalized in the entire inner peripheral surface of the sheet ring, the sealing force can be equalized, and it is possible to prevent fluid from leaking by leakage of seal.

A slanting surface is formed between the inner peripheral surface and an outer peripheral side surface of the sheet ring. An angle between the slanting surface and the outer peripheral side surface and a width of the slanting surface are greatest at a position intersecting with the valve shaft at right angles, and are smallest at a position of the valve shaft. A position intersecting with the valve shaft at right angles where the width and angle of the slanting surface are the greatest and a position of the valve shaft where the width and angle of the slanting surface are the smallest are connected with each other through a cosine curve. By forming the slanting surface between the inner peripheral surface and the outer peripheral surface of the sheet ring, a gap between the tip end of the valve element and the inner peripheral surface of the sheet ring becomes sufficiently wide in a fine opening of the valve element, it is possible to reduce the suction force on the side of an orifice which becomes the greatest at the position intersecting with the valve shaft at right angles in the fine opening, and to reduce the suction amount of the sheet ring as small as possible, and it is possible to prevent the sheet ring from falling off and from being damaged.

Further, this invention is characterized in that the valve rod which is rotatably and pivotally supported by the valve rod in the valve body is sealed. A valve rod shaft supporting portion extends radially outward of the valve body, and the valve rod is pivotally supported by the valve rod shaft supporting portion. One of the valve rods passes through the valve shaft cylindrical portion which is continuous with the valve rod shaft supporting portion and is connected to a desired actuator mounted to an outer end of the valve shaft cylindrical portion and is driven and rotated. The other valve rod is an idle side valve rod, this valve rod is located in the valve rod shaft supporting portion, a cylindrical bush whose lower end is closed is mounted to an outer end of the valve rod in a form of a cap, an opened inner end of the bush is inserted through the sheet ring and sealed. The closed outer end is held in a pulling-out-preventing state by means of a pin which is driven into the valve rod shaft supporting portion so that the shaft seal is maintained. An O-ring is mounted to an outer surface of the bush, and a gap between the outer surface and the valve rod shaft supporting portion is sealed. By the shaft seal structure, the shaft seal of the valve rod can be achieved by such a simple structure that the bush is inserted into the valve rod and is fixed by means of the pin. Therefore, it is possible to automate the shaft seal of the valve rod.

Embodiment

Figure 2:
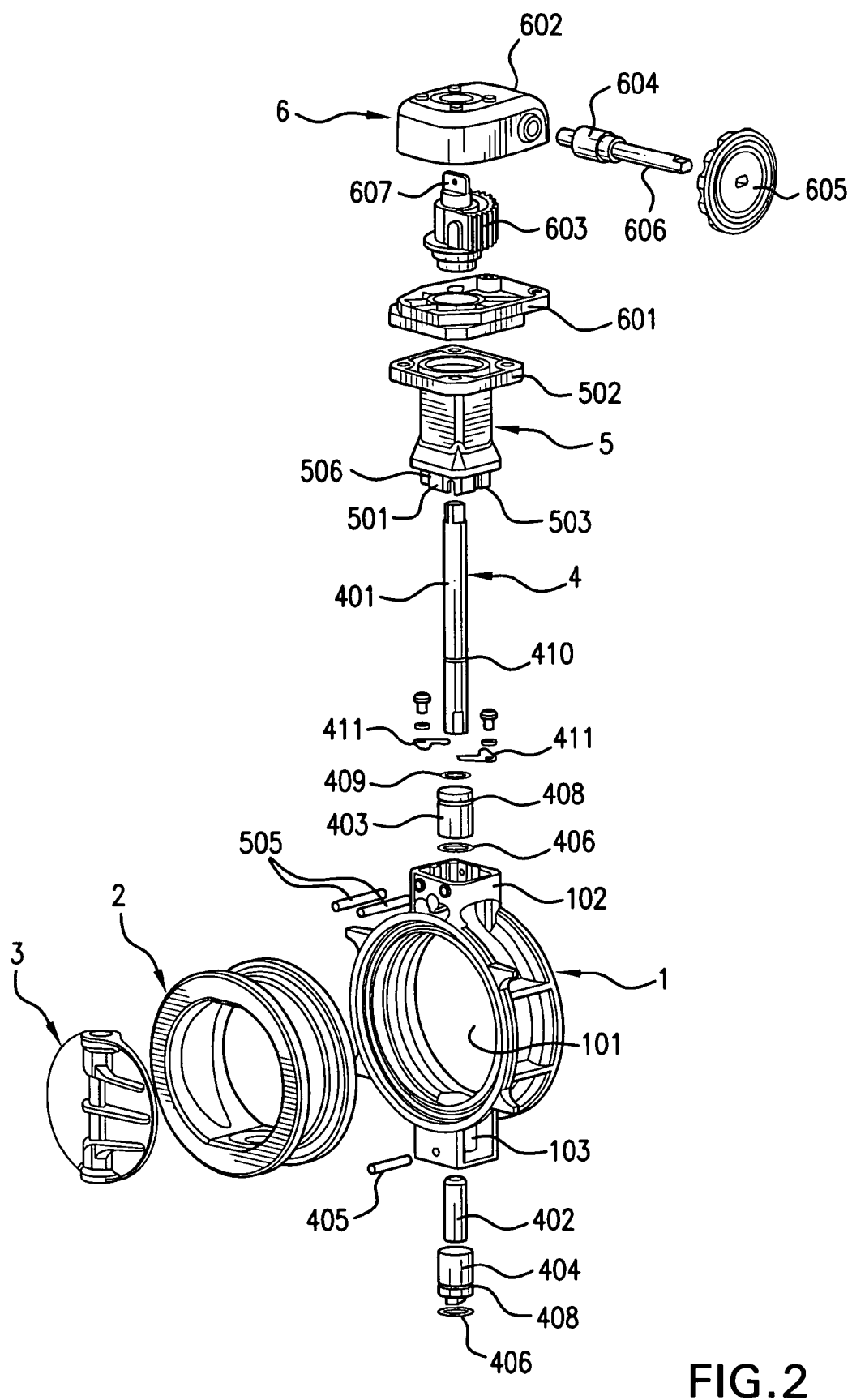
FIG. 2 is an exploded perspective view of the entire butterfly valve.
Figure 3:
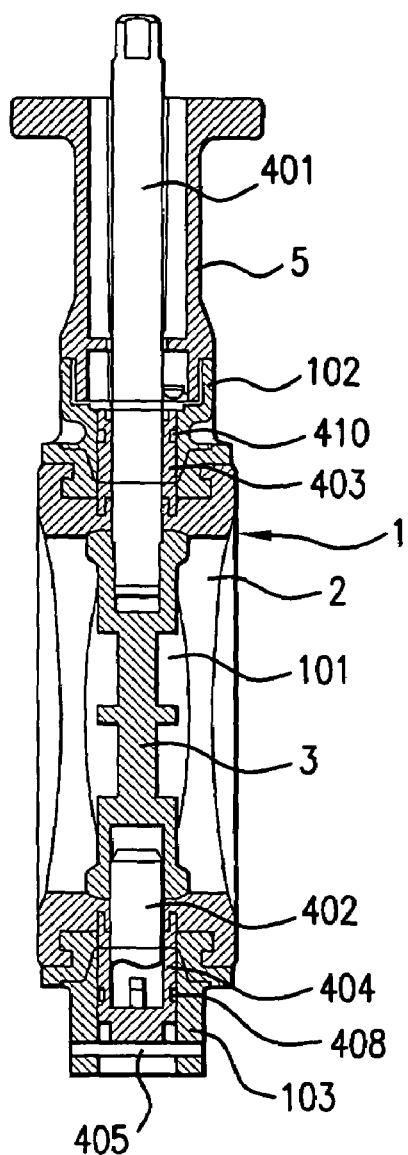
FIG. 3 is a vertical sectional view of the entire butterfly valve except an actuator thereof.

Referring to FIGS. 1 and 2, a reference number (1) represents a valve body made of aluminum die cast which passes through a flow passage (101). A sheet ring (2) made of elastic sealing material such as rubber is detachably mounted in the valve body (1), and sets a substantial diameter of the flow passage (101). A reference number (3) represents a disk-like valve element which is rotatably and pivotally supported in the sheet ring (2) by a valve rod (4). By rotating the valve element (3), an outer peripheral surface thereof is allowed to come into contact with and separated from an inner peripheral surface of the sheet ring (2), thereby opening and closing the flow passage. The valve rods (4) are rotatably and pivotally supported by valve rod shaft supporting portions (102) and (103) which extends radially outward of the valve body. One of the valve rod (401) extends long from the valve rod shaft supporting portion (102) through a valve shaft cylindrical portion (5) outward. An actuator (6) which drives and rotates the valve rod is connected to an outer end of the valve rod (401). The actuator (6) is not limited to a manual gear type actuator as shown in the drawing, and actuators of various mechanisms such as lever type actuators, electrical actuators, air cylinder type actuators and the like can be employed as the actuator (6).

The valve body (1) is provided as the aluminum die casting or molded casting, and the sheet ring is a vulcanized molded product made of elastic sealing material such as rubber. The valve element (3) is an aluminum die casting like the valve body (1), molded casting, press-worked product. The valve rod (4) is a molded product obtained by shaving a round bar or a product made by a drawing process. The valve shaft cylindrical portion (5) is a synthetic resin molded product such as nylon, ABS, PBT, PPS and the like. Upper and lower gear boxes (601) and (602) of the actuator, a worm wheel (603), a worm (604) and a handle (605) are molded using synthetic resin like the valve shaft cylindrical portion. It is not always necessary to make the worm wheel (603), the worm (604) and the handle (605) of synthetic resin.

Referring to FIGS. 3 to 6, a cylindrical flow passage (101) passes through the valve body (1) made of aluminum die cast, and the valve rod shaft supporting portions (102) and (103) extend from the outer peripheral surface of the flow passage (101) radially outward. An engaging projection (104) is formed on a central portion of an inner peripheral surface of the valve body such as to surround the inner peripheral surface. The engaging projection (104) has a width which is substantially half of the inner peripheral surface. The engaging projection (104) has a compression margin with respect to the sheet ring (2) which is different from compression margins on the opposite sides of the engaging projection when the sheet ring (2) is mounted. With this structure, the rotation torque of the valve element (3) is reduced.

Figure 4:
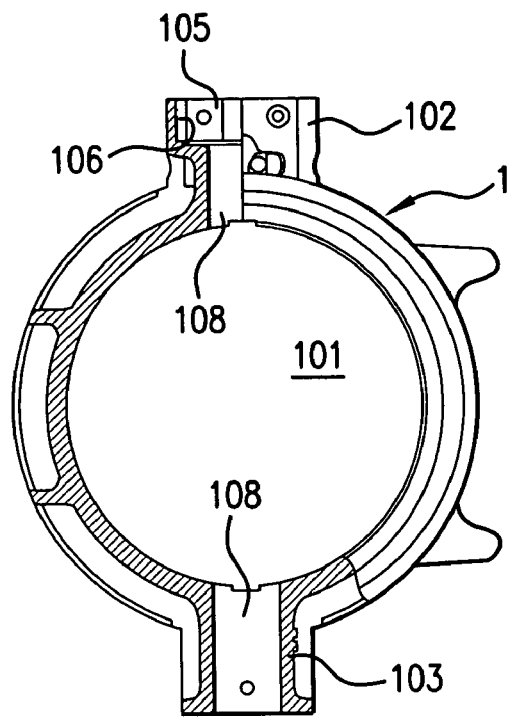
FIG. 4 is a front view of a valve body of a partially cut-away butterfly valve.
Figure 5:
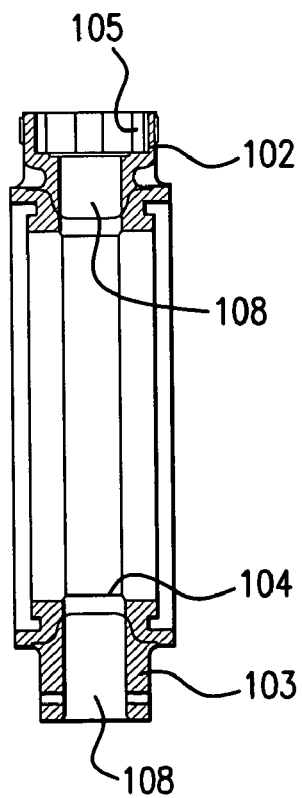
FIG. 5 is a side view of the valve body.
Figure 6:
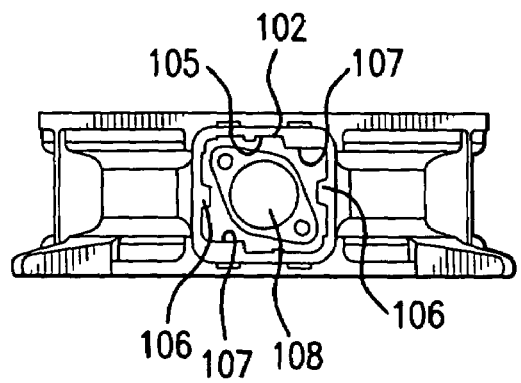
FIG. 6 is a plan view of the valve body.

As shown in FIGS. 4 to 6, a valve rod hole (108) is formed in the valve rod shaft supporting portions (102) and (103) such as to penetrate them from inside toward outside. The valve shaft cylindrical portion (5) is connected to the upper valve rod shaft supporting portion (102). As shown in FIGS. 4 to 6, a recess (105) is formed in an upper end of the upper valve rod shaft supporting portion (102) so that a projection (501) formed on a lower portion of the valve shaft cylindrical portion (5) can be engaged in the recess (105). Fitting projections (106) project from opposed inner peripheral wall surfaces of the recess (105). The fitting projection (106) is fitted into the fitting groove (503) formed in the outer peripheral surface of the projection projecting from the lower portion of the valve shaft cylindrical portion (5). The fitting projection (106) is not provided with a draft angle like the fitting groove (503), so that the fitting projection can be fitted into the fitting groove precisely. In order to enhance the strength of the inner surface angle portion (107) of the recess (105) to which the greatest load is applied by collision against the angle portion of the projection of the valve shaft cylindrical portion (5) when the valve is fully closed, a thickness of this portion is increased. The fitting projection (106) is provided slightly closer to the thick angle portion (107) rather than the central portion. With this structure, it is possible to receive all the valve-closing driving force, and to enhance the strength.

Figure 7:
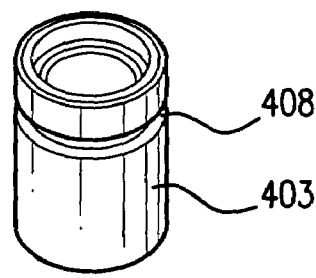
FIG. 7 is a perspective view of an upper bush.
Figure 8:
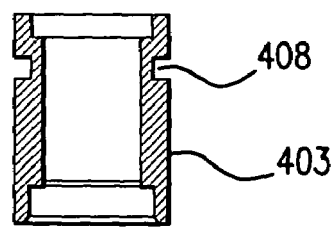
FIG. 8 is a sectional view of the upper bush.

The upper valve rod (401) whose lower end is connected to the valve element (3) has a necessary length, the upper valve rod (401) passes through the upper valve rod shaft supporting portion (102) and the valve shaft cylindrical portion (5) and extends upward, and is driven and rotated by the actuator (6) which is connected to an upper end of the upper valve rod (401). The upper valve rod (401) penetrates an upper bush (403) in the upper valve rod shaft supporting portion (102). Referring to FIGS. 7 and 8, the upper bush (403) comprises a short cylindrical body extending in the vertical direction. The upper bush (403) is formed at its outer peripheral surface with a groove (408) into which an O-ring (406) is inserted. The O-ring (406) seals a gap between the upper bush and the inner peripheral surface of the upper valve rod shaft supporting portion (102). Another O-ring (409) is mounted on an inner surface of an upper end of the upper bush (403), and the O-ring (409) seals a gap between the upper valve rod with the inner surface. A groove (410) is formed in an intermediate portion of the upper valve rod (401). A bifurcated pressing plate (411) is engaged in the groove (410) (see FIG. 2). By connecting the pressing plate (411) to an inner bottom surface of the recess (105) of the upper valve rod shaft supporting portion (102) by means of screw, the valve rod (401) is prevented from falling out.

Figure 9:
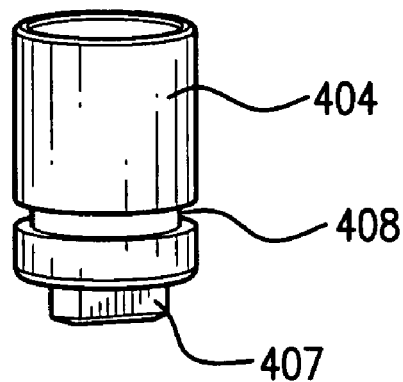
FIG. 9 is a perspective view of a lower bush.
Figure 10:
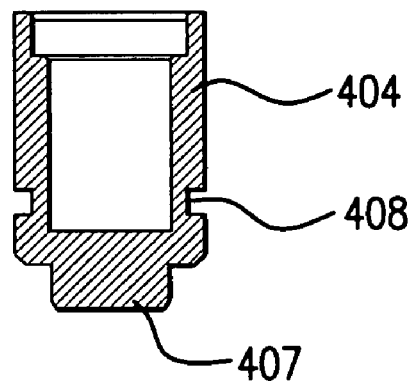
FIG. 10 is a sectional view of the lower bush.

A short lower valve rod (402) is inserted into the lower valve rod shaft supporting portion (103) from below and is connected to the valve element (3). A cylindrical lower bush (404) is inserted into the lower valve rod (402), and supports a lower surface by a fixing pin (405) driven from a lateral direction and is pivotally supported in a falling-out prevented state. As shown in FIGS. 9 and 10, the lower bush (404) comprises a short cylindrical body, an upper surface of the lower bush (404) is opened, and a lower surface thereof is closed. The lower bush (404) is inserted into the lower valve rod (402) from below in a form of a cap, and an upper end of the lower bush (404) is fitted into the sheet ring (2) and sealed. The bush is formed at its outer peripheral surface with a groove (408) into which the O-ring (406) is mounted. The O-ring (406) seals a gap between the bush and the inner peripheral surface of the lower valve rod shaft supporting portion (103). An angular columnar knob (407) projects from the closed lower surface, and the bush can easily be taken out using desired grasping means such as a nipper, a pincher or the like. Since the bottom surface of the lower bush (404) is closed, it is possible to prevent fluid from leaking out. Because of sealing effect of the O-ring, it is possible to effectively prevent fluid from leaking toward an outer periphery of the bush and from entering from outside. Further, the opened end of the bush (404) comes into tight contact with the sheet ring and the shaft seal of the lower valve rod can be achieved only by inserting the bush into the lower valve rod and driving the fixing pin (405), and the shaft seal of the lower valve rod can be automated.

Figure 11:
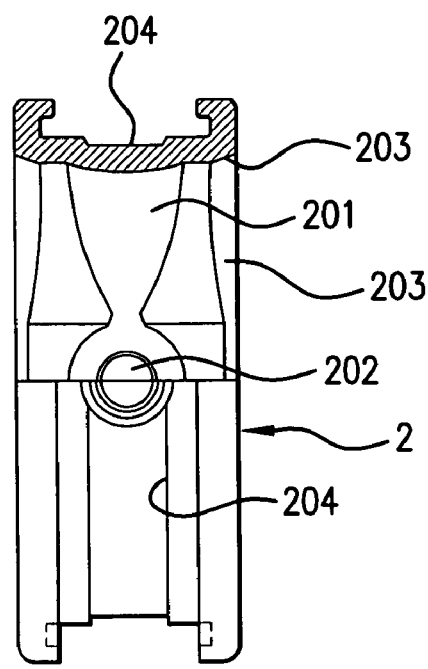
FIG. 11 is a side view of a partially cut-away sheet ring.
Figure 12:
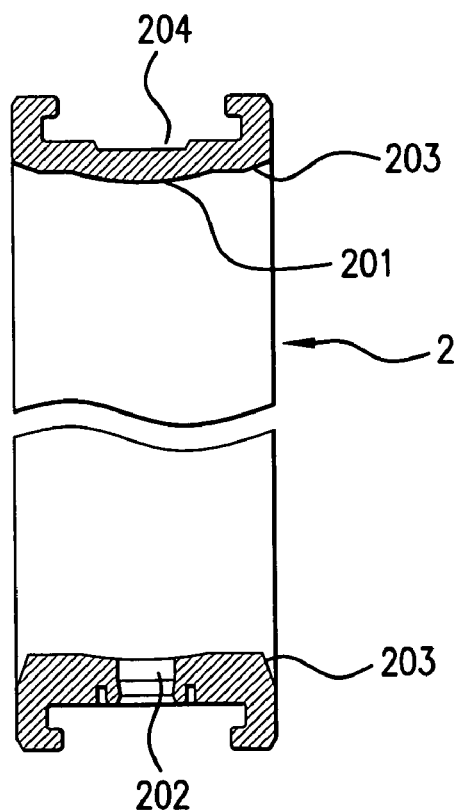
FIG. 12 is a sectional view of the sheet ring taken along a different line.

With reference to FIGS. 11 and 12, the sheet ring (2) is made of elastic sealing material such as rubber, and is vulcanized molded. A mountain-shaped sheet portion (201) projecting in a direction of an inner diameter is formed on an inner peripheral surface of the sheet ring (2). An outer peripheral surface of the valve element comes into contact with and seats on an angle sheet portion (201) under pressure and the valve is closed. The valve shaft hole (202) penetrates the sheet ring (2) in the radial direction. A width of the angle sheet portion (201) is greatest at a position where the angle sheet portion (201) intersects with the valve shaft hole (202) at right angles, and the width is gradually reduced as approaching the valve shaft hole (202), and the width becomes smallest in a boss peripheral edge of the valve shaft hole. With this design, the contact pressure with respect to the valve element (3) can be equalized substantially in the entire inner peripheral surface of the sheet ring, the sealing force can be equalized, and it is possible to prevent fluid from leaking which may be caused by leakage of the seal.

A slanting surface (203) is formed between the inner peripheral surface and the outer peripheral surface of the sheet ring (2). An angle formed between the slanting surface (203) and its outer peripheral side surface and a width of the slanting surface are greatest at a position where the slanting surface and the valve shaft intersect with each other at right angles, and are smallest at a position of the valve shaft. A position intersecting with the valve shaft at right angles where the width and angle of the slanting surface (203) are the greatest and a position of the valve shaft where the width and angle of the slanting surface are the smallest are connected with each other through a cosine curve. By forming the slanting surface (203) between the inner peripheral surface and the outer peripheral surface of the sheet ring (2), a gap between the tip end of the valve element and the inner peripheral surface of the sheet ring (2) becomes sufficiently wide in a fine opening of the valve element, it is possible to reduce the suction force on the side of an orifice which becomes the greatest at the position intersecting with the valve shaft at right angles in the fine opening, and to reduce the suction amount of the sheet ring (2) as small as possible, and it is possible to prevent the sheet ring (2) from falling off and from being damaged. The structure of this sheet ring is disclosed in Japanese Patent No. 3188680 in detail.

A recess groove (204) is formed in a central portion of the outer peripheral surface of the sheet ring (2) such as to surround the outer peripheral surface. The recess groove (204) has such width and depth that the engaging projection (104) formed on the inner peripheral surface of the valve body is engaged with the recess groove (204). An outer diameter of the sheet ring (2) does not have size which is not tightly contact with an inner surface of the valve body (1) in its portion of the recess groove (204) (portion A in FIG. 13) and is formed in a gentle contact state. On the other hand, both sides (portions B and C in FIG. 13) of the recess groove (204) have outer diameters which are tightly contacted with the inner peripheral surface of the valve body (1), and is formed into a tight contact state. With this, the sheet ring (2) is inserted and held by the inner peripheral surface of the valve body (1) at the opposite side portions B and C of the recess groove (204), the sealing ability is exhibited, and in a portion of an angle sheet portion (corresponding to the portion A) with which the valve element (3) comes into contact under pressure, as the valve element (3) comes into contact, the portion A of the sheet ring (2) is allowed to deviate, and it is possible to reduce the rotation torque of the valve element (3). That is, since the compression margins of the sheet ring (2) are different in the portions A to C, it is possible to both reduce the mutually contradictory torque, and to hold the sealing ability at the same time.

The sheet ring (2) is in a gently contacting state at the portion A, but in the portions B and C, the sheet ring (2) is mounted to and tightly contacted with the inner peripheral surface of the valve body (1) with sufficient compression ratio. Therefore, it is possible to strongly mount the sheet ring to the valve body at the portions B and C, and the sheet ring is prevented from falling off from the valve body and from being damaged by the fluid pressure. The portion A with which the valve element comes into contact under pressure and seal is achieved is not in tight contact with the inner peripheral surface of the valve body, and its movement accompanied by the valve element is allowed when the portion A comes into contact with the valve element (3). As a result, the rotation torque of the valve element becomes small, unnecessary compression by the valve element is prevented, and only the compression required for sealing is applied to the rubber. Therefore, it is possible to reduce the compression ratio of the sheet ring, and to prevent the rubber from being deteriorated. This makes it possible to use a material having relatively low tear strength such as silicon rubber as the sheet ring.

Figure 14:
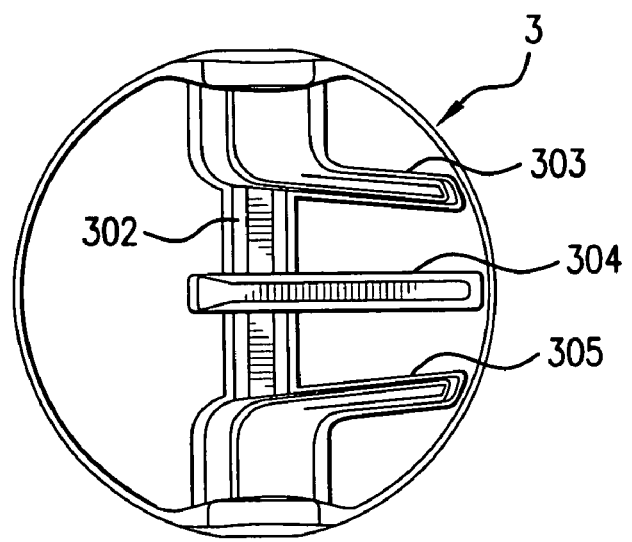
FIG. 14 is a front view of a valve element.
Figure 15:
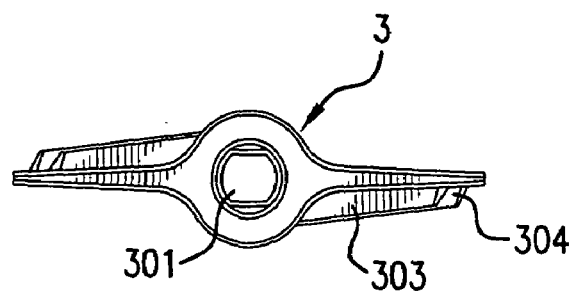
FIG. 15 is a plan view of the valve element.
Figure 16:
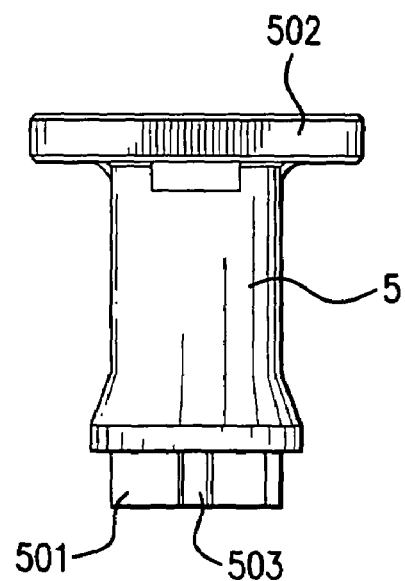
FIG. 16 is a front view of a valve shaft cylindrical portion.
Figure 17:
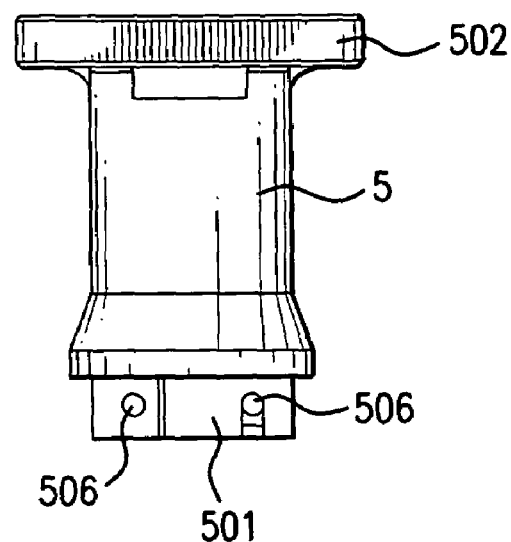
FIG. 17 is a side view of the valve shaft cylindrical portion.
Figure 18:
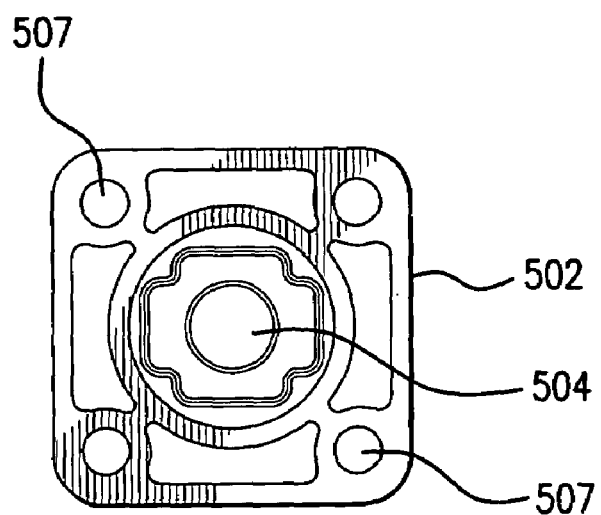
FIG. 18 is a plan view of the valve shaft cylindrical portion.
Figure 19:
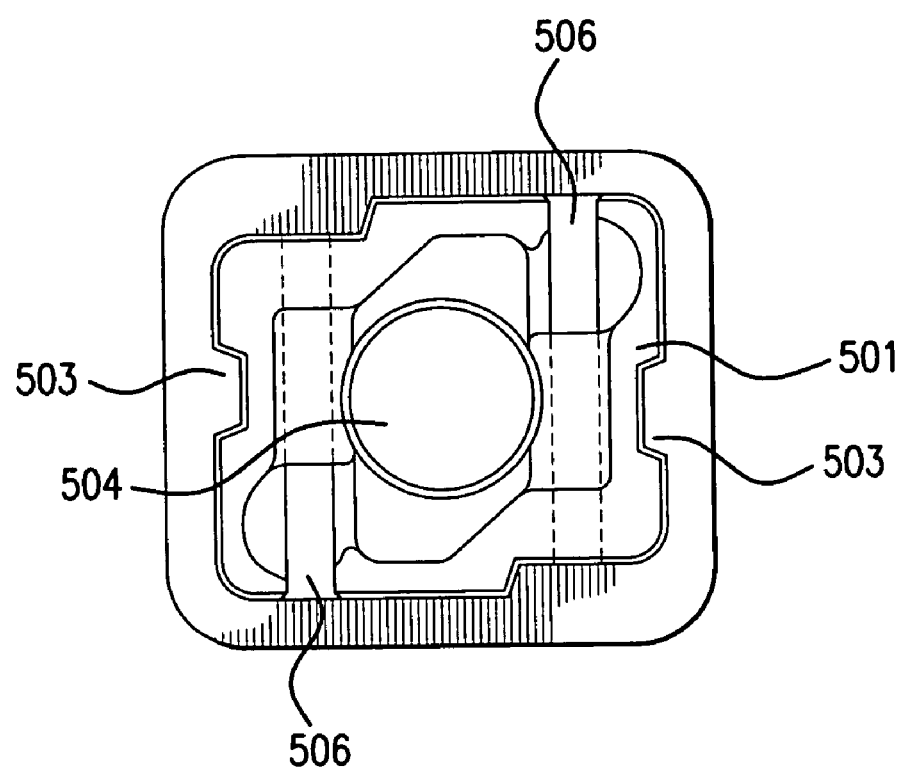
FIG. 19 is a bottom view of the valve shaft cylindrical portion.
Figure 20:
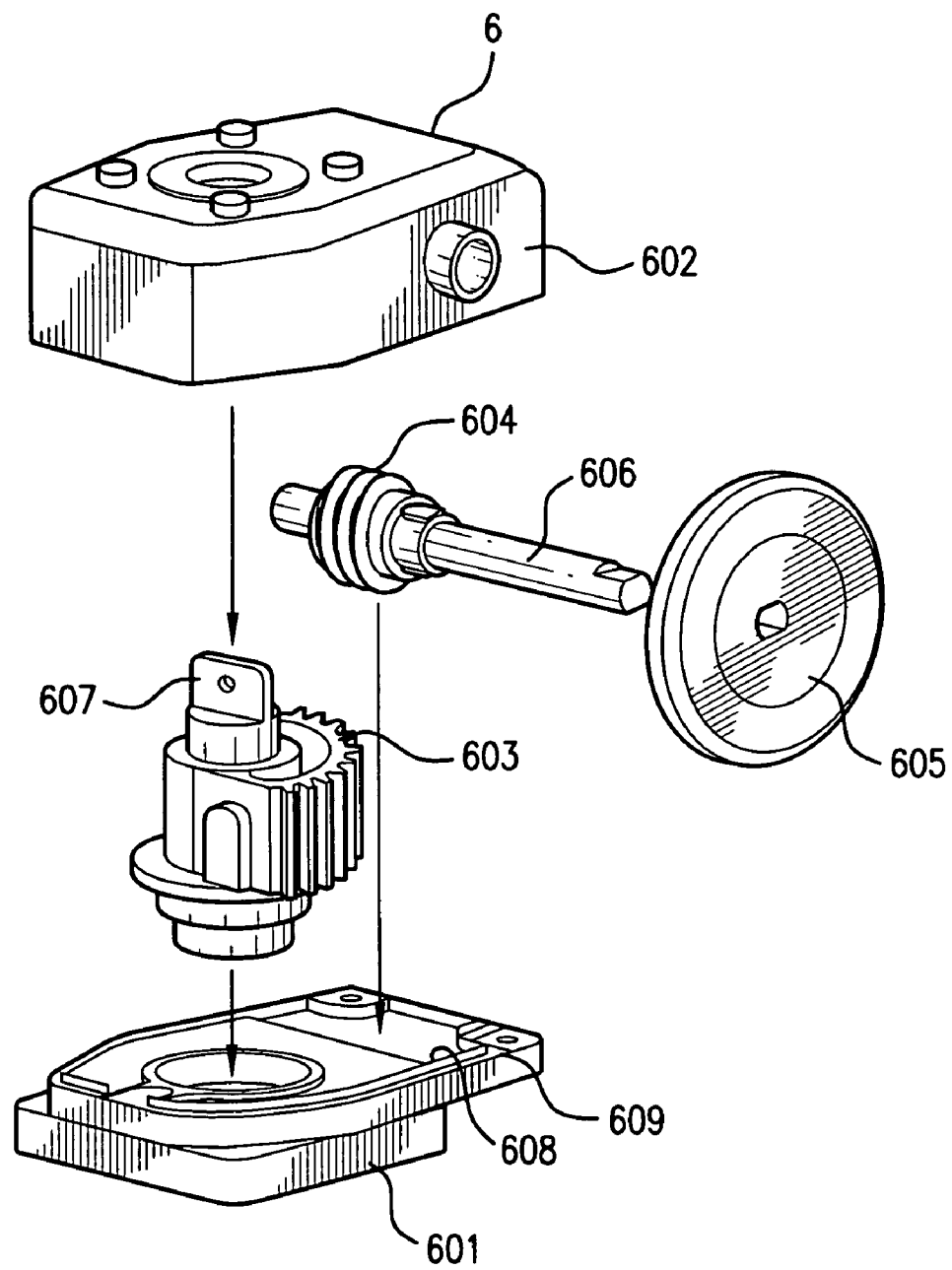
FIG. 20 is an exploded perspective view of the actuator.

Referring to FIGS. 14 and 15, a basic shape of the valve element (3) is disk-like shape. As shown in FIG. 15, the valve element (3) is formed into a slant surface whose thickness is gradually reduced toward its outer periphery. In a state in which bosses of upper and lower valve rod holes (301) are connected to each other, a vertical rib (302) extending from a center of a surface of the valve element in the axial direction is formed. Three lateral ribs (303), (304) and (305) are formed on a surface of the valve element on the side of a nozzle and on the side of an orifice such as to extend substantially in parallel to a direction perpendicular to a direction of the valve shaft. Each of the lateral ribs (303), (304) and (305) has a constant height from the surface of the valve element, and a direction of fluid flowing in the vicinity of the valve element surface is controlled using this rib.

That is, a center lateral rib (304) is located at a maximum flow velocity in the pipe, divides the maximum flow velocity and accelerates the flow velocity. The lateral ribs (303) and (305) disposed above and below the center rib are inclined toward the center lateral rib, and directs the fluid in a low speed region near the pipe wall in a direction of the center lateral rib, and its speed is increased in a state in which the fluid is pulled into the flow velocity which is accelerated by the center rib. With respect to the fluid, the bosses of the upper and lower valve rod holes (301) functions as a resistance of the flow passage, fluid which collides against the boss generates swirl on a secondary side of the boss, and this further increases the fluid resistance. The three lateral ribs exhibit rectifying effect with respect to swirl generated on the secondary side of the boss, and reduces generation of swirl. As a result the three lateral ribs divide the flow velocity in the pipe and rectify the flow, complement a resistance of fluid on the pipe wall and a resistance of fluid on a surface of the valve element by flowing direction control owned by the ribs, and reduce the flow resistance of the entire valve.

Referring to FIGS. 2 and 16 to 19, the valve shaft cylindrical portion (5) is a substantially rectangular cylindrical body which is made of nylon and which has necessary length, and the upper valve rod (401) penetrates inside of the valve shaft cylindrical portion (5) and extends in the vertical direction. A lower portion of the valve shaft cylindrical portion (5) is formed with the projection (501) which is fitted into the recess (105) formed in the upper valve rod shaft supporting portion (102). An upper portion of the valve shaft cylindrical portion (5) is formed with a supporting plate (502) on which a lower gearbox (601) of the actuator (6) is placed and supported. The projection (501) has an outer peripheral surface shape corresponding to an inner peripheral surface shape of the recess (105), the inner peripheral surface can be fitted into the outer peripheral surface, the fitting groove (503) into which the projection formed on an inner surface opposed to the recess (105) is fitted is formed in the outer peripheral surface. The fitting groove (503) is aligned to a position of the fitting projection (106), and is formed at a position slightly deviated from the center. A valve rodhole (504) vertically penetrates the center of the valve shaft cylindrical portion. A pinhole (506) for driving the connection pin (505) is formed in a surface of the projection (501) where the fitting groove (503) is not formed. Bolt insertion holes (507) are formed in four corners of the supporting plate (502).

The valve body (1) and the valve shaft cylindrical portion (5) are connected to each other in such a manner that the fitting projection (106) is first engaged into the fitting groove (503), and the projection (501) on the lower portion of the valve shaft cylindrical portion (5) is driven into the recess (105) of the upper valve rod shaft supporting portion (102). Next, the connection pin (505) is driven into the upper valve rod shaft supporting portion (102) and the valve shaft cylindrical portion (5) from a lateral direction, thereby connecting both of them. The upper valve rod shaft supporting portion (102) and the valve shaft cylindrical portion (5) are fitted to each other by rectangular cylindrical shapes of the recess (105) and the projection (501), or precisely fitted to each other by precise position, size and shape of the fitting projection (106) and the fitting groove (503), and by driving of the connection pin, and it is possible to reliably prevent the torsional stress caused by the actuator (6) and to prevent the falling out accident, and it is possible to achieve extremely strong and stable connection.

As described above, the recess (105) and the projection (501) suffice only if they are fitted to each other using the angle shape, and they need not be fitted precisely to each other using the angle shape of the entire connection surfaces, and only the fitting projection (106) and the fitting groove (503) need to be machined precisely, the number of parts which need to be precisely machined is small, the machining operation is facilitated as a whole, and the costs can be reduced. The connection pin is driven to prevent the falling out accident in the axial direction. Therefore, together with the connection structure for preventing the torsional stress, it is possible to strongly and stably connect the valve body and the valve shaft cylindrical portion made of different materials such as metal and synthetic resin. As a result, it is possible to produce the valve body having a complicated structure by relatively easy metal working such as the aluminum die casting, and to make the valve shaft cylinder of insulative material, and the valve body and the valve shaft are connected to form the butterfly valve which prevents the condensation.

Referring to FIGS. 2 to 20 to 22, the actuator (6) includes the worm wheel (603) which is rotatably and pivotally supported in the gear box formed by connecting the lower gear box (601) and the upper gear box (602), and the worm (604) which meshes with the worm wheel. An upper end of the upper valve rod (401) is non-rotatably connected to the worm wheel (603), and a handle shaft (606) is connected to the worm (604). The handle (605) is mounted to the outer end of the handle shaft (606). The upper and lower gear boxes have the worm wheel and the worm therein, and are placed on the upper supporting plate (502) of the valve shaft cylindrical portion (5), and bolt and nut are inserted through the gear boxes and the boxes are fastened by the bolt and nut. A reference number (607) represents an opening instructing plate (607) integrally stands on the worm wheel (603), and the opening instructing plate (607) projects upward from the upper gear box and shows opening of the valve element.

Figure 21:
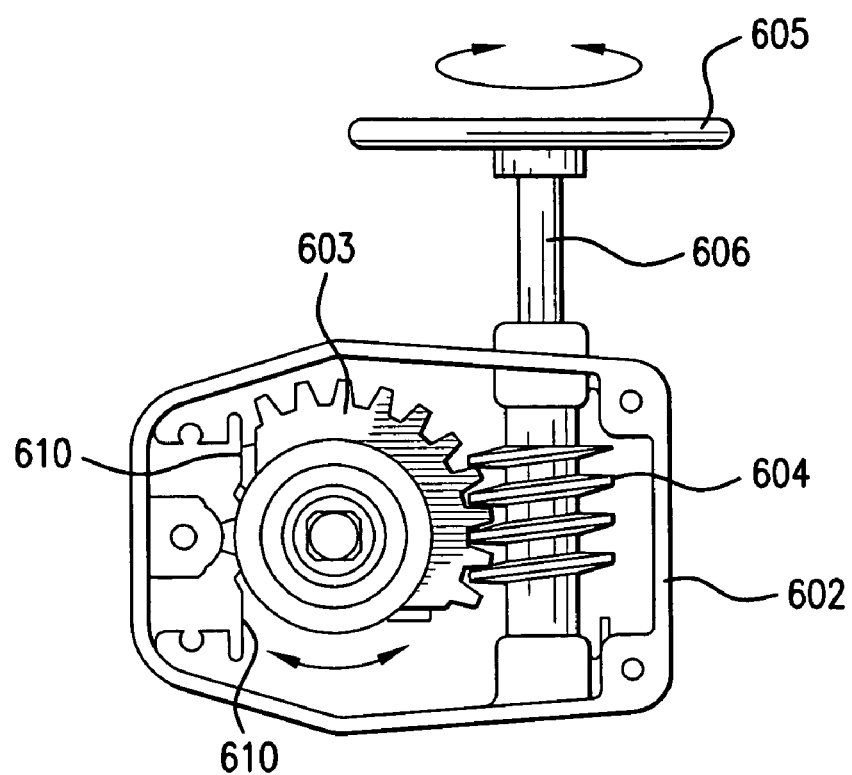
FIG. 21 is a diagram showing an interior of an upper gear box.
Figure 22:
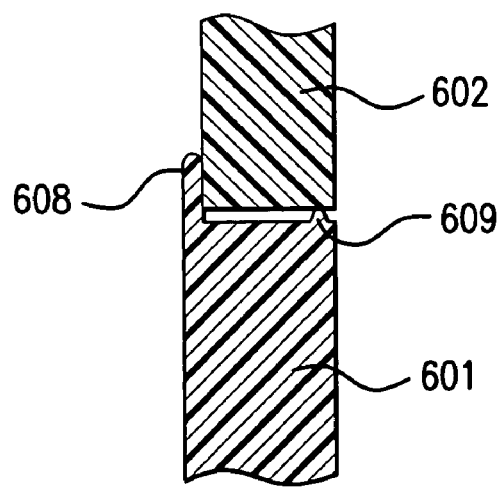
FIG. 22 is a sectional view showing details of connected portion between upper and lower gear box.

The upper and lower gear boxes (601) and (602) are made of synthetic resin such as nylon ABS, PBT, PPS or the like. As shown in FIG. 21, a stopper (610) for stopping the worm wheel (603) at a fully opening position and a fully closing position at an rotation angle of 90 degree is integrally formed in the upper gear box (602). As shown in FIG. 22, an upper standing wall (608) is formed on an upper periphery of the lower gear box (601). The upper standing wall (608) is fitted to the upper gear box. Further, a sealing projection (609) projects outward of the upper standing wall (608) at a slight distance therefrom. Because the upper standing wall (608) exists, it is possible to easily and reliably combine the upper and lower gear boxes. The sealing projection (609) abuts against a lower surface of the upper gear box, and when they are fastened by bolt and nut, the sealing projection (609) is fitted into the lower surface, and sealing ability is exhibited. When a packing is interposed therebetween, the sealing projection compresses the packing, and reliable sealing effect can be obtained.

Since the entire upper and lower gear boxes are molded using synthetic resin, the size precision is enhanced, and the opening stopper (606) can be integrally formed. As a result, opening adjusting means by means of a screw is not required unlike the conventional technique, the entire structure can be simplified, and the costs can be reduced. Since synthetic resin having insulative properties is used, it is possible to effectively prevent condensation. It is easy to obtain a greaseless structure using resin having higher lubrication ability. Recently, a butterfly valve of this kind is disposed in a room. From a point of view of this situation, the fact that grease is charged into the gear box can solve the problem of contamination of a room floor and a wall surface caused by leakage of grease, and this structure is extremely beneficial.

The invention claimed is:

1. A butterfly valve in which a cylindrical flow passage is formed in the valve body such as to penetrate the valve body, a sheet ring made of elastic sealing material is mounted in the valve body, a disk-like valve element which comes into contact with and separates from the sheet ring is rotatably and pivotally supported by the sheet ring, a valve rod shaft supporting portion is formed in a radial direction of the valve body, the valve rod shaft supporting portion pivotally supports valve rods which pivotally support the valve element, an actuator is connected to an outer end of one of the valve rods, thereby driving and rotating the valve element, wherein a portion of the one valve rod which extends outward is pivotally supported, the valve shaft cylindrical portion which is connected to the valve rod shaft supporting portion is made of material different from that of the valve body, ends of the valve shaft cylindrical portion and the valve rod shaft supporting portion are formed into rectangular cylindrical recess and projection which are fitted to each other, a fitting projection and a fitting groove which fit to fitting surfaces of the valve shaft cylindrical portion and the valve rod shaft supporting portion are formed, a connection pin is driven into the fitting portions of the valve shaft cylindrical portion and the valve rod shaft supporting portion and they are connected to each other in a falling-out preventing state.

2. A butterfly valve according to claim 1, wherein a compression margin of the sheet ring with respect to an inner peripheral surface of the valve body is set such that the compression margin is small at a central portion of the sheet ring and the compression margin is great at opposite sides of the sheet ring so that the sheet ring is held by the inner peripheral surface of the valve body by an elastic fastening force at the opposite sides, the central portion of the sheet ring with which the valve element comes into contact under pressure is allowed to move slightly together with the valve element, and a movable torque of the valve element is reduced.

3. A butterfly valve according to claim 2, wherein a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft.

4. A butterfly valve according to claim 3, wherein a central portion of an inner peripheral surface of the valve body is allowed to project inward to form an engaging projection, a recess groove into which the engaging projection is engaged is formed in the outer peripheral surface of the sheet ring, and the sheet ring is held by engaging the engaging projection and recess groove with each other.

5. A butterfly valve according to claim 3, wherein a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft.

6. A butterfly valve according to claim 2, wherein a central portion of an inner peripheral surface of the valve body is allowed to project inward to form an engaging projection, a recess groove into which the engaging projection is engaged is formed in the outer peripheral surface of the sheet ring, and the sheet ring is held by engaging the engaging projection and recess groove with each other.

7. A butterfly valve according to claim 6, wherein a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft.

8. A butterfly valve according to claim 2, wherein a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft.

9. A butterfly valve according to claim 2, wherein a cylindrical bush whose one end is closed is inserted into the other valve rod, an inner end of the bush is brought into contact with the sheet ring under pressure to seal the valve rod, and outer end of the bush is supported in a falling-out preventing state by means of a pin which is driven into the valve rod shaft supporting portion.

10. A butterfly valve according to claim 2, wherein the actuator comprises a coupled body of upper and lower to gear boxes in which a manually driven worm gear mechanism, both the upper and lower gear boxes are molded products made of synthetic resin, a stopper portion which limits a rotation range of the worm gear mechanism is integrally formed in the gear box, one connection peripheries of the upper and lower gear boxes are formed with upper standing walls to which the other peripheries are fitted, the upper standing wall is provided at its outer side with a sealing projection.

11. A butterfly valve according to claim 2, wherein the valve body is molded using aluminum die cast, and the valve shaft cylindrical portion is molded using synthetic resin having insulative properties.

12. A butterfly valve according to claim 2, wherein the valve shaft cylindrical portion is molded using iron-based casting or metal material which is different from that of the valve body.

13. A butterfly valve according to claim 2, wherein a thickness of an inner surface angle portion of the recess with which an angle portion of the projection comes into contact upon reception of torsional stress from the actuator is made thick, the fitting projection and the fitting groove are located near this thick angle portion.

14. A butterfly valve according to claim 1, wherein a cylindrical bush whose one end is closed is inserted into the other valve rod, an inner end of the bush is brought into contact with the sheet ring under pressure to seal the valve rod, and outer end of the bush is supported in a falling-out preventing state by means of a pin which is driven into the valve rod shaft supporting portion.

15. A butterfly valve according to claim 14, wherein an O-ring is interposed between the bush and the valve rod shaft supporting portion to seal a gap therebetween.

16. A butterfly valve according to claim 15, wherein a knob is formed on an outer end of the bush for taking out the bush.

17. A butterfly valve according to claim 14, wherein a knob is formed on an outer end of the bush for taking out the bush.

18. A butterfly valve according to claim 14, wherein the actuator comprises a coupled body of upper and lower to gear boxes in which a manually driven worm gear mechanism, both the upper and lower gear boxes are molded products made of synthetic resin, a stopper portion which limits a rotation range of the worm gear mechanism is integrally formed in the gear box, one connection peripheries of the upper and lower gear boxes are formed with upper standing walls to which the other peripheries are fitted, the upper standing wall is provided at its outer side with a sealing projection.

19. A butterfly valve according to claim 14, wherein the valve body is molded using aluminum die cast, and the valve shaft cylindrical portion is molded using synthetic resin having insulative properties.

20. A butterfly valve according to claim 14, wherein the valve shaft cylindrical portion is molded using iron-based casting or metal material which is different from that of the valve body.

21. A butterfly valve according to claim 14, wherein a thickness of an inner surface angle portion of the recess with which an angle portion of the projection comes into contact upon reception of torsional stress from the actuator is made thick, the fitting projection and the fitting groove are located near this thick angle portion.

22. A butterfly valve according to claim 1, wherein the actuator comprises a coupled body of upper and lower to gear boxes in which a manually driven worm gear mechanism, both the upper and lower gear boxes are molded products made of synthetic resin, a stopper portion which limits a rotation range of the worm gear mechanism is integrally formed in the gear box, one connection peripheries of the upper and lower gear boxes are formed with upper standing walls to which the other peripheries are fitted, the upper standing wall is provided at its outer side with a sealing projection.

23. A butterfly valve according to claim 22, wherein the valve body is molded using aluminum die cast, and the valve shaft cylindrical portion is molded using synthetic resin having insulative properties.

24. A butterfly valve according to claim 22, wherein the valve shaft cylindrical portion is molded using iron-based casting or metal material which is different from that of the valve body.

25. A butterfly valve according to claim 22, wherein a thickness of an inner surface angle portion of the recess with which an angle portion of the projection comes into contact upon reception of torsional stress from the actuator is made thick, the fitting projection and the fitting groove are located near this thick angle portion.

26. A butterfly valve according to claim 1, wherein the valve body is molded using aluminum die cast, and the valve shaft cylindrical portion is molded using synthetic resin having insulative properties.

27. A butterfly valve according to claim 26, wherein the valve shaft cylindrical portion is molded using iron-based casting or metal material which is different from that of the valve body.

28. A butterfly valve according to claim 26, wherein a thickness of an inner surface angle portion of the recess with which an angle portion of the projection comes into contact upon reception of torsional stress from the actuator is made thick, the fitting projection and the fitting groove are located near this thick angle portion.

29. A butterfly valve according to claim 1, wherein the valve shaft cylindrical portion is molded using iron-based casting or metal material which is different from that of the valve body.

30. A butterfly valve according to claim 29, wherein a thickness of an inner surface angle portion of the recess with which an angle portion of the projection comes into contact upon reception of torsional stress from the actuator is made thick, the fitting projection and the fitting groove are located near this thick angle portion.

31. A butterfly valve according to claim 1, wherein a thickness of an inner surface angle portion of the recess with which an angle portion of the projection comes into contact upon reception of torsional stress from the actuator is made thick, the fitting projection and the fitting groove are located near this thick angle portion.

32. A butterfly valve in which a cylindrical flow passage is formed in the valve body such as to penetrate the valve body, a sheet ring made of elastic sealing material is mounted in the valve body, a disk-like valve element which comes into contact with and separates from the sheet ring is rotatably and pivotally supported by the sheet ring, a valve rod shaft supporting portion is formed in a radial direction of the valve body, the valve rod shaft supporting portion pivotally supports valve rods which pivotally support the valve element, an actuator is connected to an outer end of one of the valve rods, thereby driving and rotating the valve element, wherein a portion of the one valve rod which extends outward is pivotally supported, the valve shaft cylindrical portion which is connected to the valve rod shaft supporting portion is made of material different from that of the valve body, ends of the valve shaft cylindrical portion and the valve rod shaft supporting portion are formed into rectangular cylindrical recess and projection which are fitted to each other, a fitting projection and a fitting groove which fit to fitting surfaces of the valve shaft cylindrical portion and the valve rod shaft supporting portion are formed, a thickness of an inner surface angle portion of the recess with which an angle portion of the projection comes into contact upon reception of torsional stress from the actuator is made thick, the fitting projection and the fitting groove are located near this thick angle portion, a connection pin is driven into the fitting portions of the valve shaft cylindrical portion and the valve rod shaft supporting portion and they are connected to each other in a falling-out preventing state, the valve body is molded using aluminum die cast, and the valve shaft cylindrical portion is molded using synthetic resin having insulative properties, a slanting surface is formed between the inner peripheral surface and the outer peripheral surface of the sheet ring, an angle and a width formed by the slanting surface and the outer peripheral side surface are the greatest at a position intersecting with the valve shaft at right angles and are the smallest at a position of the valve shaft, a central portion of an inner peripheral surface of the valve body is allowed to project inward to form an engaging projection, the sheet ring is brought into contact with the inner peripheral surface of the valve body under pressure in the opposite sides of the recess groove, the cylindrical bush whose one end is closed is mounted to the other valve rod which pivotally supports the valve element, and the other valve rod is sealed.

* * * * *